United States Patent
Trowbridge et al.

(10) Patent No.: US 11,691,824 B2
(45) Date of Patent: Jul. 4, 2023

(54) SLIP AND WRAP DETECTION SYSTEMS FOR A CONVEYOR BELT OF AN AGRICULTURAL HEADER

(71) Applicant: CNH Industrial America LLC, New Holland, PA (US)

(72) Inventors: Jeffrey C. Trowbridge, Stevens, PA (US); Cory Douglas Hunt, Millersville, PA (US)

(73) Assignee: CNH Industrial America LLC, New Holland, PA (US)

(*) Notice: Subject to any disclaimer, the term of this patent is extended or adjusted under 35 U.S.C. 154(b) by 614 days.

(21) Appl. No.: 16/782,245

(22) Filed: Feb. 5, 2020

(65) Prior Publication Data
US 2021/0237982 A1 Aug. 5, 2021

(51) Int. Cl.
*B65G 43/04* (2006.01)
*A01D 41/14* (2006.01)
(Continued)

(52) U.S. Cl.
CPC .......... *B65G 43/04* (2013.01); *A01D 41/141* (2013.01); *A01D 57/20* (2013.01); *A01D 61/02* (2013.01); *B65G 43/08* (2013.01); *B65G 2201/0202* (2013.01); *B65G 2203/0291* (2013.01); *B65G 2203/044* (2013.01)

(58) Field of Classification Search
CPC .. B65G 43/04; B65G 43/08; B65G 2203/044; B65G 2203/0291; B65G 2201/0202; A01D 61/02; A01D 57/20; A01D 41/141; A01D 41/14; A01D 41/1274; A01D 41/1271
See application file for complete search history.

(56) References Cited

U.S. PATENT DOCUMENTS 8,495,855 B1 7/2013 Conrad et al.
8,527,157 B2 9/2013 Imhof et al.
(Continued)

FOREIGN PATENT DOCUMENTS

CN 202848594 U 4/2013
CN 105173613 A 12/2015
(Continued)

OTHER PUBLICATIONS

International Search Report for Application No. PCT/US2021/016962 dated May 25, 2021 (four pages).

*Primary Examiner* — Arpad F Kovacs
(74) *Attorney, Agent, or Firm* — Peter Zacharias

(57) ABSTRACT

A detection system for an agricultural header includes a belt that has at least one physical feature driven by a roller at a roller rotational speed. The detection system also includes a sensor that detects a physical feature as it passes the sensor during rotation of the belt. The detection system further includes a controller that receives a signal indicating a first pulse of a first time a physical feature passes the sensor during the rotation of the belt and a second pulse of a second time a physical feature passes the sensor during the rotation of the belt. The controller further determines a pulse frequency based on the first and second times and calculates a belt rotational speed based on the pulse frequency. The controller compares the belt rotational speed to the roller rotational speed and provides an output if the roller rotational speed exceeds a threshold.

20 Claims, 10 Drawing Sheets

(51) Int. Cl.
*A01D 57/20* (2006.01)
*A01D 61/02* (2006.01)
*B65G 43/08* (2006.01)

(56) References Cited

U.S. PATENT DOCUMENTS

| | | | |
|---|---|---|---|
| 8,833,044 B2 * | 9/2014 | Hoffman | A01D 43/06 |
| | | | 56/10.6 |
| 9,265,199 B2 * | 2/2016 | Ritter | A01D 75/287 |
| 9,668,406 B2 * | 6/2017 | Dybro | A01D 41/141 |
| 2010/0223896 A1 * | 9/2010 | Eick | A01D 61/002 |
| | | | 56/181 |
| 2017/0359953 A1 * | 12/2017 | Wallace | A01D 57/20 |
| 2018/0054964 A1 * | 3/2018 | Füchtling | A01D 41/127 |
| 2019/0124844 A1 * | 5/2019 | Lovett | A01D 41/1271 |
| 2019/0144209 A1 | 5/2019 | Happe | |

FOREIGN PATENT DOCUMENTS

| | | | | |
|---|---|---|---|---|
| DE | 102017104998 A1 * | 9/2018 | | B65G 43/08 |
| EP | 2382854 A1 * | 11/2011 | | A01D 41/142 |
| EP | 2774472 A2 | 9/2014 | | |
| EP | 3095314 A1 | 11/2016 | | |
| EP | 2995190 B1 * | 8/2017 | | A01D 41/1274 |
| EP | 3466241 A1 | 4/2019 | | |
| EP | 3476199 A1 | 5/2019 | | |
| WO | WO-2017190961 A1 * | 11/2017 | | A01D 57/20 |
| WO | WO-2017220281 A1 * | 12/2017 | | B65G 23/44 |
| WO | 2019140512 A1 | 7/2019 | | |

* cited by examiner

SLIP AND WRAP DETECTION SYSTEMS FOR A CONVEYOR BELT OF AN AGRICULTURAL HEADER

BACKGROUND

The present disclosure relates generally to a slip and wrap detection system for a conveyor belt of an agricultural header.

A harvester may be used to harvest crops, such as barley, beans, beets, carrots, corn, cotton, flax, oats, potatoes, rye, soybeans, wheat, or other plant crops. During operation of the harvester, the harvesting process may begin by removing a portion of a plant from a field using a header of the harvester. The header may cut the plant and transport the cut crops to a processing system of the harvester.

Certain headers include a cutter bar assembly configured to cut a portion of each crop (e.g., a stalk), thereby separating the cut crop from the soil. The cutter bar assembly may extend along a substantial portion of the width of the header at a forward end of the header. The header may also include one or more belts positioned behind the cutter bar assembly relative to the direction of travel of the harvester. The belt(s) are configured to transport the cut crops to an inlet of the processing system.

BRIEF DESCRIPTION

In one embodiment a detection system for an agricultural header includes a belt that has at least one physical feature. The detection system also includes a roller that drives rotation of the belt at a roller rotational speed. The detection system also includes a sensor that detects at least one physical feature as it passes the sensor during the rotation of the belt. Finally, the detection system includes a controller configured to receive a signal indicating a first pulse of a first time at which the at least one physical feature passes the sensor during the rotation of the belt and a second pulse indicative of a second time at which the at least one physical feature passes the sensor during the rotation of the belt. The controller further determines a pulse frequency based on the first time and the second time and calculates a belt rotational speed based on the pulse frequency. The controller compares the belt rotational speed to the roller rotational speed and provides an output in response to determining that a variation between the belt rotational speed and the roller rotational speed exceeds a threshold.

In one embodiment, a method for operating a detection system for an agricultural header includes receiving, at a processor, a first pulse indicative of a first physical feature passing the sensor and receiving, at the processor, a second pulse indicative of a second physical feature passing the sensor. The method further includes determining, using the processor, a pulse frequency based on a time between the first pulse and the second pulse and calculating, using the processor, a belt rotational speed based on the pulse frequency. The method further includes comparing, using the processor, the belt rotational speed to a roller rotational speed of a roller that drives rotation of the belt and providing, using the processor, an output in response to determining that a variation between the belt rotational speed and the roller rotational speed exceeds a threshold.

In one embodiment an agricultural header includes a belt that rotates to enable the belt to convey crops and a roller that drives rotation of the belt. The agricultural header further includes a sensor that detects a change in an offset position of the belt. The offset position is a radial distance between an inner surface of the belt and an outer surface of the roller. The agricultural header further includes a controller that receives a signal from the sensor that has an offset distance indicative of the change in the offset position of the belt and compares the offset distance to an offset threshold. The controller further provides an output in response to determining that the offset distance exceeds the offset threshold.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Figure 1:
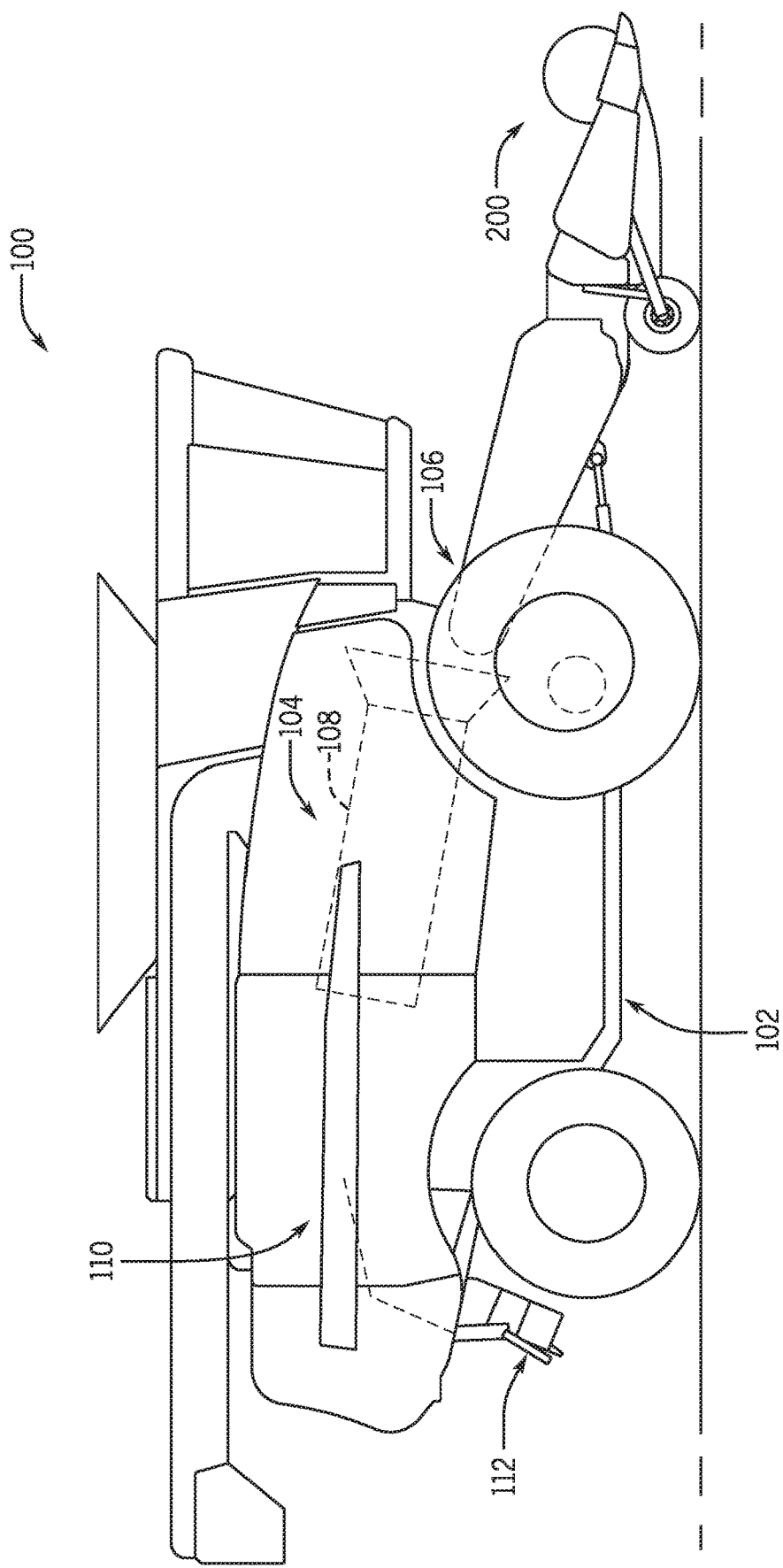
FIG. 1 is a side view of a harvester, in accordance with embodiments of the present disclosure.

Turning to the drawings, FIG. 1 is a side view of an embodiment of an agricultural harvester 100 having a header 200 (e.g., agricultural header). The agricultural harvester 100 includes a chassis 102 configured to support the header 200 and an agricultural crop processing system 104. As described in greater detail below, the header 200 is configured to cut crops and to transport the cut crops toward an inlet 106 of the agricultural crop processing system 104 for further processing of the cut crops. The agricultural crop processing system 104 receives cut crops from the header 200 and separates desired crop material from crop residue. For example, the agricultural crop processing system 104 may include a thresher 108 having a cylindrical threshing rotor that transports the crops in a helical flow path through the harvester 100. In addition to transporting the crops, the thresher 108 may separate certain desired crop material (e.g., grain) from the crop residue, such as husks and pods, and enable the desired crop material to flow into a cleaning system located beneath the thresher 108. The cleaning system may remove debris from the desired crop material and transport the desired crop material to a storage compartment within the harvester 100. The crop residue may be transported from the thresher 108 to a crop residue handling system 110, which may remove the crop residue from the harvester 100 via a crop residue spreading system 112 positioned at the aft end of the harvester 100.

As discussed in detail below, the header 200 includes a cutter bar assembly configured to cut the crops within the field. The cutter bar assembly is configured to flex along a width of the header to enable the cutter bar assembly to substantially follow the contours of the field. The cutter bar assembly is supported by multiple arms distributed along the width of the header. Each arm is pivotally mounted to a frame of the header, thereby enabling the cutter bar assembly to flex. To increase the flexibility of the cutter bar assembly, the frame may be divided into multiple sections that are pivotally coupled to one another. For example, the frame may include a center section, a first wing section positioned on a first lateral side of the center section, and a second wing section positioned on a second lateral side of the center section, opposite the first lateral side. The first wing section and the second wing section may each be pivotally coupled to the center section by a respective pivot joint. As a result, a flexible frame is formed, thereby increasing the flexibility of the cutter bar assembly.

The header 200 includes a reel assembly configured to urge crops cut by the cutter bar assembly onto belts that convey the cut crops toward the inlet 106 of the agricultural crop processing system 104. As discussed in detail below, the reel assembly includes a reel having multiple fingers extending from a central framework. The central framework is driven to rotate such that the fingers engage the cut corps and urge the cut crops toward the belts. To enable the reel to flex with the header frame, the reel may include multiple sections coupled to one another by pivot joints. For example, the reel may include a center section (e.g., positioned forward of the center section of the header frame), a first wing section (e.g., positioned forward of the first wing section of the header frame), and a second wing section (e.g., positioned forward of the second wing section of the header frame). The first wing section and the second wing section of the reel may each be coupled to the center section of the reel by a respective pivot joint. As a result, a flexible reel is formed, thereby enabling the reel to flex with the header frame.

Figure 2:
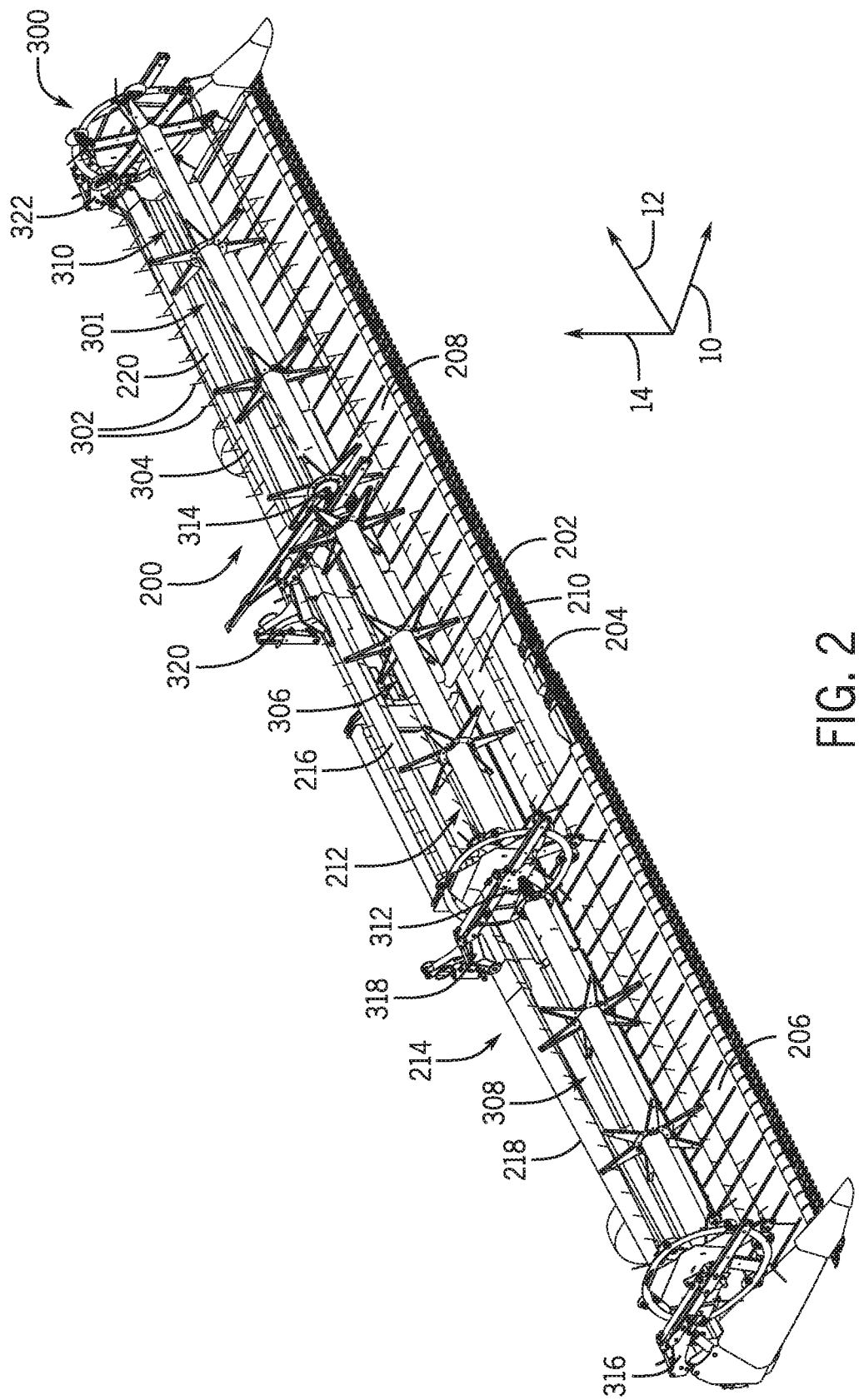
FIG. 2 is a perspective view of a header that may be employed within the harvester of FIG. 1, in accordance with embodiments of the present disclosure.

FIG. 2 is a perspective view of an embodiment of a header 200 that may be employed within the agricultural harvester of FIG. 1. In the illustrated embodiment, the header 200 includes a cutter bar assembly 202 configured to cut a portion of each crop (e.g., a stalk), thereby separating the crop from the soil. The cutter bar assembly 202 is positioned at a forward end of the header 200 relative to a longitudinal axis 10 of the header 200. As illustrated, the cutter bar assembly 202 extends along a substantial portion of the width of the header 200 (e.g., the extent of the header 200 along a lateral axis 12). The cutter bar assembly 202 includes a blade support, a stationary guard assembly, and a moving blade assembly. The moving blade assembly is fixed to the blade support (e.g., above the blade support along a vertical axis 14 of the header 200), and the blade support/moving blade assembly is driven to oscillate relative to the stationary guard assembly. In the illustrated embodiment, the blade support/moving blade assembly is driven to oscillate by a driving mechanism 204 positioned at the lateral center of the header 200. However, in other embodiments, the blade support/moving blade assembly may be driven by another suitable mechanism (e.g., located at any suitable position on the header). As the harvester is driven through a field, the cutter bar assembly 202 engages crops within the field, and the moving blade assembly cuts the crops (e.g., the stalks of the crops) in response to engagement of the cutter bar assembly 202 with the crops.

In the illustrated embodiment, the header 200 includes a first lateral belt 206 on a first lateral side of the header 200 and a second lateral belt 208 on a second lateral side of the header 200, opposite the first lateral side. Each belt is driven to rotate by a suitable drive mechanism, such as an electric motor or a hydraulic motor. The first lateral belt 206 and the second lateral belt 208 are driven such that the top surface of each belt moves laterally inward. In addition, the header 200 includes a longitudinal belt 210 positioned between the first lateral belt 206 and the second lateral belt 208 along the lateral axis 12. The longitudinal belt 210 is driven to rotate by a suitable drive mechanism, such as an electric motor or a hydraulic motor. The longitudinal belt 210 is driven such that the top surface of the longitudinal belt 210 moves rearwardly along the longitudinal axis 10.

In the illustrated embodiment, the crops cut by the cutter bar assembly 202 are directed toward the belts by a reel assembly 300, thereby substantially reducing the possibility of the cut crops falling onto the surface of the field. The reel assembly 300 includes a reel 301 having multiple fingers 302 extending from a central framework 304. The central framework 304 is driven to rotate such that the fingers 302 move (e.g., in a circular pattern). The fingers 302 are configured to engage the cut crops and urge the cut crops toward the belts. The cut crops that contact the top surface of the lateral belts 206, 208 are driven laterally inwardly to the longitudinal belt 210 due to the movement of the lateral belts 206, 208. In addition, cut crops that contact the longitudinal belt 210 and the cut crops provided to the longitudinal belt 210 by the lateral belts 206, 208 are driven rearwardly along the longitudinal axis 10 due to the movement of the longitudinal belt 210. Accordingly, the belts move the cut agricultural crops through an opening 212 in the header 200 to the inlet of the agricultural crop processing system.

In the illustrated embodiment, the cutter bar assembly 202 is flexible along the width of the header 200 (e.g., the extent of the header 200 along the lateral axis 12). The cutter bar assembly 202 is supported by multiple arm assemblies distributed along the width of the header 200 (e.g., along the lateral axis 12 of the header 200). Each arm assembly is mounted to a frame 214 of the header 200 and includes an arm configured to rotate and/or move along the vertical axis 14 relative to the frame. Each rotatable/movable arm is coupled to the cutter bar assembly 202, thereby enabling the cutter bar assembly 202 to flex during operation of the harvester. The flexible cutter bar assembly may follow the contours of the field, thereby enabling the cutting height (e.g., the height at which each crop is cut) to be substantially constant along the width of the header 200 (e.g., the extent of the header 200 along the lateral axis 12).

In the illustrated embodiment, the frame 214 is divided into multiple sections that are pivotally coupled to one another, thereby increasing the flexibility of the cutter bar assembly 202. As illustrated, the frame 214 includes a center section 216, a first wing section 218 positioned on a first lateral side of the center section 216 (e.g., along the lateral axis 12), and a second wing section 220 positioned on a second lateral side of the center section 216, opposite the first lateral side (e.g., along the lateral axis 12). The first wing section 218 and the second wing section 220 are each pivotally coupled to the center section 216 by a respective pivot joint. As a result, a flexible frame 214 is formed, thereby increasing the flexibility of the cutter bar assembly 202.

In the illustrated embodiment, the reel 301 includes multiple sections coupled to one another by pivot joints to enable the reel 301 to flex with the header frame. As illustrated, the reel 301 includes a center section 306 (e.g., positioned forward of the center section 216 of the header frame 214 along the longitudinal axis 10), a first wing section 308 (e.g., positioned forward of the first wing section 218 of the header frame 214 along the longitudinal axis 10), and a second wing section 310 (e.g., positioned forward of the second wing section 220 of the header frame 214 along the longitudinal axis 10). The first wing section 308 is pivotally coupled to the center section 306 by a first pivot joint 312, and the second wing section 310 is pivotally coupled to the center section 306 by a second pivot joint 314. As a result, a flexible reel 301 is formed, thereby enabling the reel 301 to flex with the header frame 214.

In the illustrated embodiment, the first wing section 308 of the reel 301 is supported by a first arm 316 coupled to the first wing section 218 of the frame 214, the center section 306 of the reel 301 is supported by a second arm 318 and a third arm 320 each coupled to the center section 216 of the frame 214, and the second wing section 310 of the reel 301 is supported by a fourth arm 322 coupled to the second wing section 220 of the frame 214. As discussed in detail below, a first pivot joint pivotally couples the first arm 316 to the frame 214, and a second pivot joint pivotally couples the second arm 318 to the frame 214. The first pivot joint is configured to enable the first arm 316 to pivot about a first local lateral axis of the agricultural header 200 (e.g., a lateral axis of the first wing section 218 of the frame 214) and about the longitudinal axis 10 relative to the frame 214. In addition, the second pivot joint is configured to enable the second arm 318 to pivot about a second local lateral axis of the agricultural header 200 (e.g., a lateral axis of the center section 216 of the frame 214) relative to the frame 214 and to substantially block pivoting of the second arm 318 about the longitudinal axis 10 relative to the frame 214. In certain embodiments, an actuator is coupled to each arm and configured to drive the arm to rotate about the respective local lateral axis, thereby controlling a position of the reel 301 relative to the frame 214 along the vertical axis 214 (e.g., to control engagement of the fingers of the reel with the cut agricultural crops). Because the first pivot joint enables the first arm 316 to pivot about the longitudinal axis 10, the distance between the first arm/reel connection point and the second arm/reel connection point may be substantially maintained as the header frame 214 flexes (e.g., as the first wing section 218 of the header frame 214 pivots relative to the center section 216 of the header frame 214). The features of the header 200 illustrated and described with respect to FIG. 2 are provided as examples to facilitate discussion. It should be appreciated that the systems and techniques disclosed herein may be used with various belts on any of a variety of headers or other types of agricultural equipment.

Figure 3:
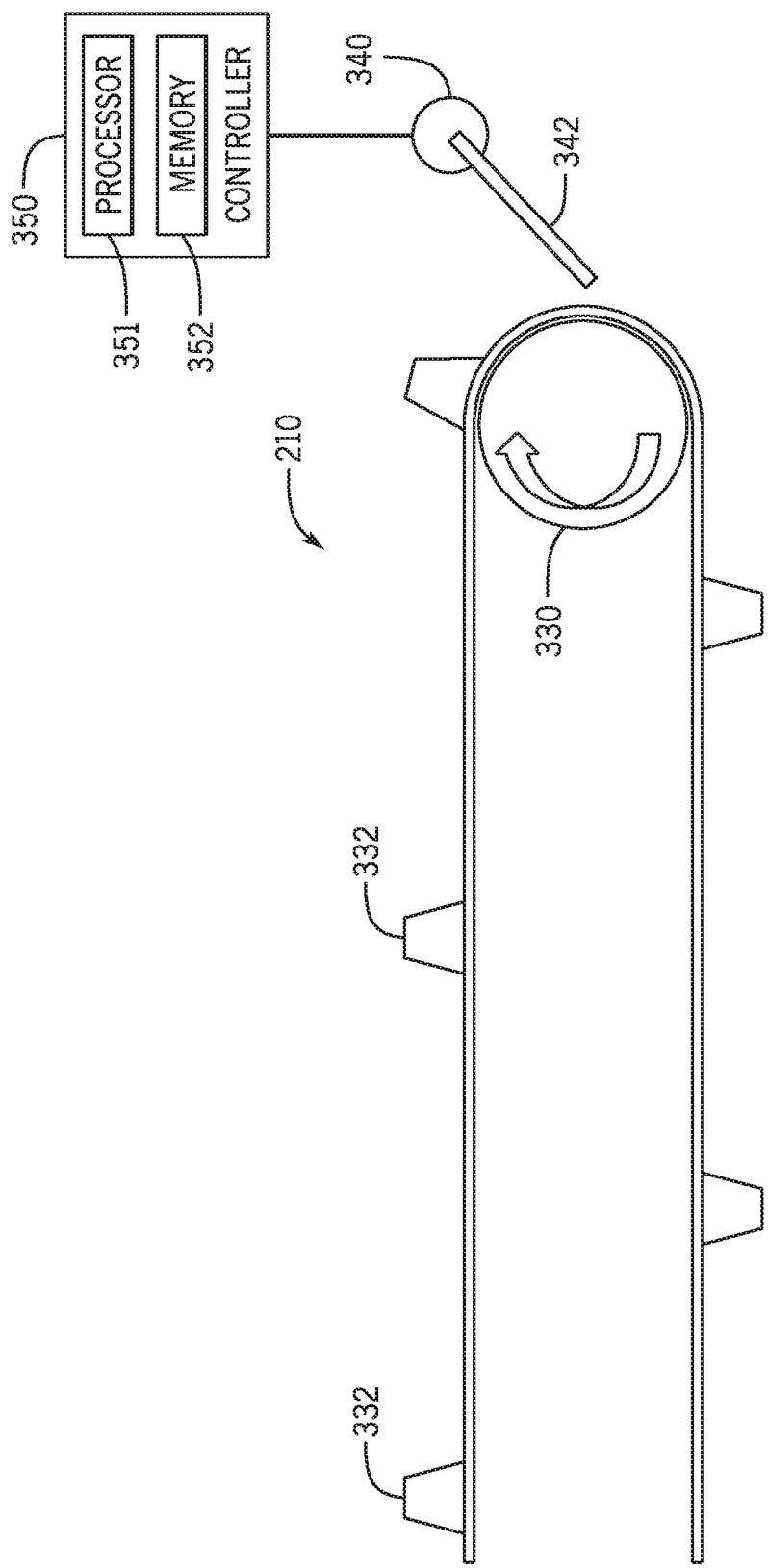
FIG. 3 is a side view of a portion of the header of FIG. 2, in which a belt assembly includes a rotary sensor, in accordance with embodiments of the present disclosure.

FIG. 3 is a side view of a portion of the header 200 showing the longitudinal belt 210. As shown, the longitudinal belt 210 rotates around and is driven to rotate by a roller 330 (e.g., cylindrical roller), which is driven to rotate by a motor (e.g., an electric motor or a hydraulic motor). The roller 330 may contact an inner surface of the longitudinal belt 210 to drive the longitudinal belt 210 to rotate. The roller 330 may be a driver roller, as shown in FIG. 3, which is indirectly or directly connected to the motor. The longitudinal belt 210 may utilize multiple rollers, either driver rollers (e.g., two driver rollers on opposite ends of the loop formed by the longitudinal belt 210) and/or inner rollers. A rotational speed of the roller 330 may remain constant or vary depending on a desired operation of the longitudinal belt 210 or other factors. The rotational speed of the longitudinal belt 210 may be adjusted by an operator of the agricultural harvester by adjusting the rotational speed of the roller 330. In the illustrated embodiment, the roller 330 rotates in a clockwise direction; however, the roller 330 may rotate in a counterclockwise direction.

As shown, the longitudinal belt 210 includes multiple lugs 332 (e.g., protrusions, notches, grooves, holes, or any other physical feature) located on an outer surface of the longitudinal belt 210. Each lug 332 may be spaced apart (e.g., an equal distance apart) from the other lug 332 upward or downward on the longitudinal belt 210. Any number of lugs 332 (e.g., 1, 2, 3, 4, 5, or more) may be positioned at the outer surface of the longitudinal belt 210. The lugs 332 may be made out of any type of plastic, rubber, metal, or other material. As shown, the lugs 332 extend outwardly from the outer surface, which may enable the lugs 332 to provide support for crops. For example, crops may stack up in particular locations along the longitudinal belt 210 and may be unable to move toward their destination (e.g., the agricultural crop processing system) despite the roller(s) 330 turning the longitudinal belt 210. The lugs 332 may facilitate movement of the stack of crops by coming in contact with and driving the crop. A height of the lug 332 may vary, such as based on the type of crop being harvested. For example, an agricultural harvester harvesting oats may use a shorter lug 332 than an agricultural harvester harvesting corn, which may benefit from a longer lug 332 due to the smaller size of the corn. The lugs 332 may be coupled (e.g., fastened, such as via fasteners, adhesives) to the longitudinal belt 210 or may be manufactured with the belt to be a single entity (e.g., integrally formed). As such, the lugs 332 move (e.g., rotate) with the longitudinal belt 210.

In the illustrated embodiment, the lugs 332 contact a rotary sensor 340 as the longitudinal belt 210 rotates about the roller 330. As shown in FIG. 3, the rotary sensor 340 may be positioned adjacent to the roller 330, such that an arm 342 of the rotary sensor 340 contacts the lugs 332 of the longitudinal belt 210 as the lugs 332 move about the roller 330 (e.g., as the lugs 332 pass between the roller 330 and the arm 342 of the rotary sensor 340). Such a configuration may provide more accurate detection of the lugs 332 (e.g., as opposed to a position between rollers 330, where the longitudinal belt 210 may sag and/or be covered by crops). However, the rotary sensor 340 may be placed anywhere along the longitudinal belt 210 in a manner that allows the rotary sensor 340 to detect movement of the longitudinal belt 210. For example, the rotary sensor 340 may be placed near a roller that is proximate to a center of the header and/or closer to the agricultural harvester, so less wiring may be used. The rotary sensor 340 may be supported by and/or connected to the header via an arm, an extension pole, or fastened directly to the header, for example. The arm 342 of the rotary sensor 342 may be biased toward the longitudinal belt 210 via a biasing member.

In the illustrated embodiment, the rotary sensor 340 enables calculation of a rotational speed of the longitudinal belt 210 by measuring a pulse frequency associated with the lugs 332 on the longitudinal belt 210 (e.g., a number of lugs 332 detected over a period of time; a time between detection of adjacent lugs 332). As the lugs 332 contact the arm 342 of the rotary sensor 340, the arm 342 moves with the lugs 332. The arm 342 is then reset to an initial position when the arm 342 is no longer in contact with the lugs 332. Each movement of the arm 342 due to a passing lug 332 may be recorded as a pulse. The pulses may be sent to a controller 350 having a processor 351 and a memory 352 via a wired or a wireless connection. The controller 350 may control operation of the rotary sensor 340 and/or process signals received from the rotary sensor 340. For example, the controller 350 may receive pulse signals from the rotary sensor 340. The processor 351 may process the pulse signals to determine the rotational speed of the longitudinal belt 210 (e.g., based on a distance between the lugs 332, which is known, and a time between the pulses). The controller 350 may compare the rotational speed of the longitudinal belt 210 to a rotational speed of the roller 330 (e.g., output by the motor that drives the roller 330; output by another sensor that measures the rotational speed of the roller 330). In one or more embodiments, the rotational speed of the longitudinal belt 210 may be different than the rotational speed of the roller 330, such as due to slippage of the longitudinal belt 210 relative to the roller 330. In response to determining that the rotational speed of the longitudinal belt 210 is different than the rotational speed of the roller 330 (e.g., a variation exceeds a threshold), the processor 351 may determine that the longitudinal belt 210 is not operating as expected, such as due to slippage of the longitudinal belt 210 relative to the roller 330.

The processor 351 may be any suitable type of computer processor or microprocessor capable of executing computer-executable code. The processor 351 may also include multiple processors that may perform the operations described herein. The memory 352 may represent non-transitory computer-readable media (e.g., any suitable form of memory or storage) that may store the processor-executable code used by the processor 351 to perform various techniques described herein. It should be noted that non-transitory merely indicates that the media is tangible and not a signal.

In the embodiment shown, the rotary sensor 340 may output a signal that has temporary increases in amplitude over time (e.g., pulses), as shown in a pulse frequency graph that is illustrated in and discussed in more detail below with reference to FIG. 5.

While the longitudinal belt 210 is illustrated in and described with reference to FIG. 3, it should be appreciated that additionally or alternatively one or more of the lateral belts may be monitored in the same manner. For example, each of the lateral belts may rotate about a respective roller, and a respective rotary sensor may be used to measure a respective rotational speed of each of the lateral belts. The controller 350 may receive a respective signal from the respective rotary sensor and may determine whether the respective signal indicates slippage relative to the respective roller. Thus, it should be appreciated that the term "belt" herein may refer to any of the lateral belts (e.g., the lateral belts 206, 208 of FIG. 2) or the longitudinal belt 210, for example.

Figure 4:
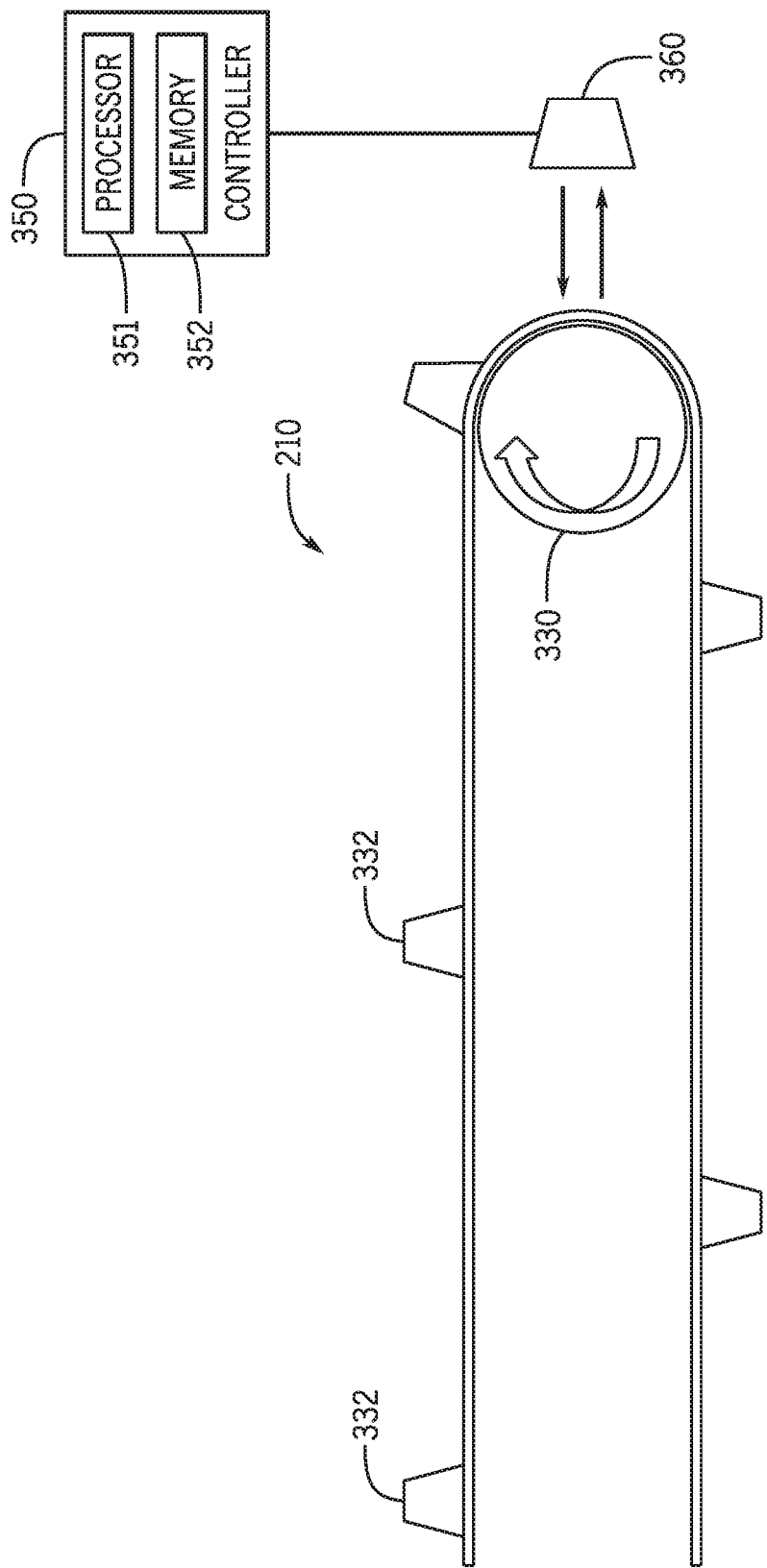
FIG. 4 is a side view of the portion of the header of FIG. 2, in which a belt assembly includes an optical sensor, in accordance with embodiments of the present disclosure.

Turning to FIG. 4, a side view of a portion of the header 200 of FIG. 2 in which the rotational speed of the longitudinal belt 210 is measured by an optical sensor 360 is shown. It should be appreciated that the optical sensor 360 may be replaced with any other suitable proximity sensor (e.g., acoustic sensor). As previously discussed, the roller 330 moves the longitudinal belt 210, which includes lugs 332 (e.g., is coupled to or integrally formed with; any number of lugs 332). Similar to the rotary sensor discussed above with reference to FIG. 3, the optical sensor 360 may be placed anywhere relative to the longitudinal belt 210, the roller 330, and the header to measure the pulse frequency of the lugs 332 as the lugs 332 pass within range of the optical sensor 360. In the illustrated embodiment, the optical sensor 360 may detect a distance between the optical sensor 360 and the longitudinal belt 210 by emitting a light, laser, soundwaves, or any type of signal that detects proximity. As each lug 332 passes the optical sensor 360, the distance that the signal travels is shortened (e.g., decreased), and thus, a pulse is detected. Thus, the optical sensor 360 enables calculation of the rotational speed of the longitudinal belt 210 by measuring the pulse frequency associated with the lugs 332 on the longitudinal belt 210 (e.g., a number of lugs 332 detected over a period of time; a time between detection of adjacent lugs 332).

The distance measured by the optical sensor 360 may be sent from the optical sensor 360 to the controller 350 via a wired or wireless connection. The controller 350 may control operation of the optical sensor 360 and/or process signals received from the optical sensor 360. For example, the controller 350 may receive pulse signals from the optical sensor 360. The processor 351 may process the pulse signals to determine the rotational speed of the longitudinal belt 210, as discussed above with reference to FIG. 3.

In the embodiment shown, the optical sensor 360 may output a signal that has increases in amplitude over time (e.g., pulses), which is represented by a pulse frequency graph that is illustrated in and discussed in more detail below with reference to FIG. 5. It should be appreciated that the structure of the lugs 332 shown in FIGS. 3 and 4 is merely exemplary. As noted above, the lugs 332 may be notches, grooves, or holes that are detectable by the optical sensor 360 (e.g., the optical sensor 360 generates a pulse each time the physical features passes by the optical sensor 360). While the longitudinal belt 210 is illustrated in and described with reference to FIG. 4, it should be appreciated that additionally or alternatively one or more of the lateral belts may be monitored in the same manner. For example, each of the lateral belts may rotate about a respective roller, and a respective optical sensor may be used to measure a respective rotational speed of each of the lateral belts. The controller 350 may receive a respective signal from the respective optical sensor and may determine whether the respective signal indicates slippage relative to the respective roller.

Figure 5:
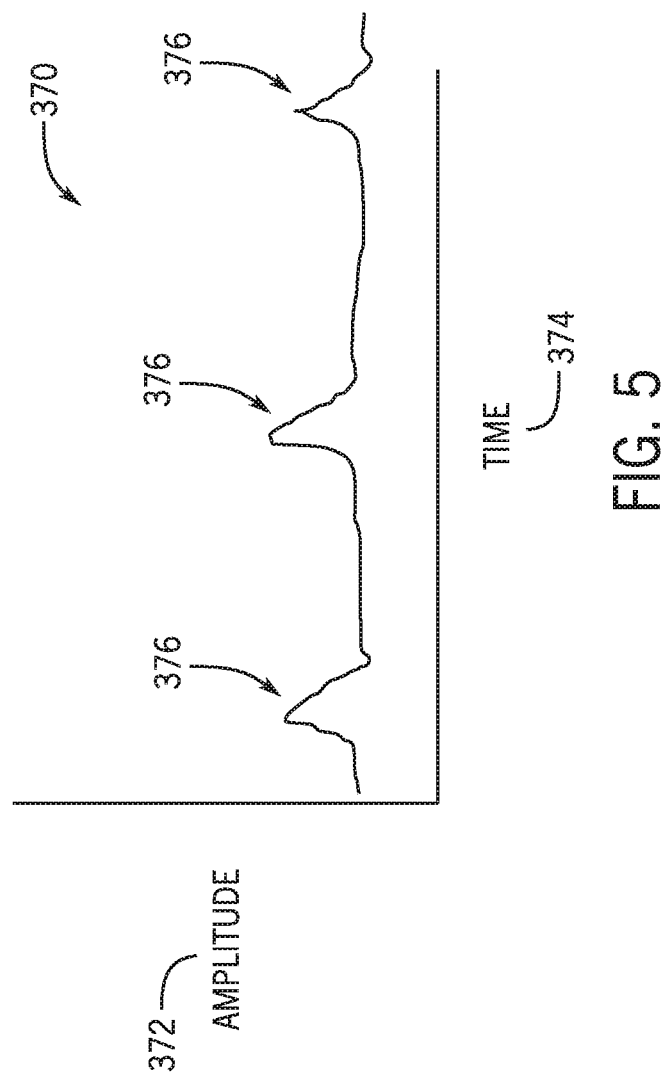
FIG. 5 is a graph that shows a signal that may be output by the rotary sensor of FIG. 3 or the optical sensor of FIG. 4, in accordance with embodiments of the present disclosure.

With the foregoing in mind, FIG. 5 shows a pulse frequency graph 370, which may be representative of a signal output by the rotary sensor of FIG. 3 or the optical sensor of FIG. 4 and/or which may facilitate understanding of the present techniques. In some embodiments, the pulse frequency graph 370 may be generated by the controller. The pulse frequency graph 370 may be a 2D plot of amplitude 372 along the y-axis and time 374 along the x-axis. The amplitude 372 may be representative of an amount of movement of the arm 342 of the rotary sensor 340 or the distance between the longitudinal belt and the optical sensor. As each lug passes by the rotary sensor or the optical sensor, the amplitude 372 changes (e.g., increases) in response to movement of the arm of the rotary sensor or to a shorter distance measured by the optical sensor, respectively. This change in amplitude 372 is represented by a pulse 376 on the pulse frequency graph 370. The pulse 376 may be long or short depending on the amount of time 374 it takes for the lug to pass the rotary sensor or the optical sensor. A time between each pulse 376 (i.e., period) represents the time between each successive lug passing by the rotary sensor or the optical sensor. By calculating the period between the pulses 376 over time and using the known distance between each lug, the controller may determine the rotational speed of the longitudinal belt. Then, the controller may compare the rotational speed of the longitudinal belt to the rotational speed of the roller, such as to identify slippage, for example.

Figure 6:
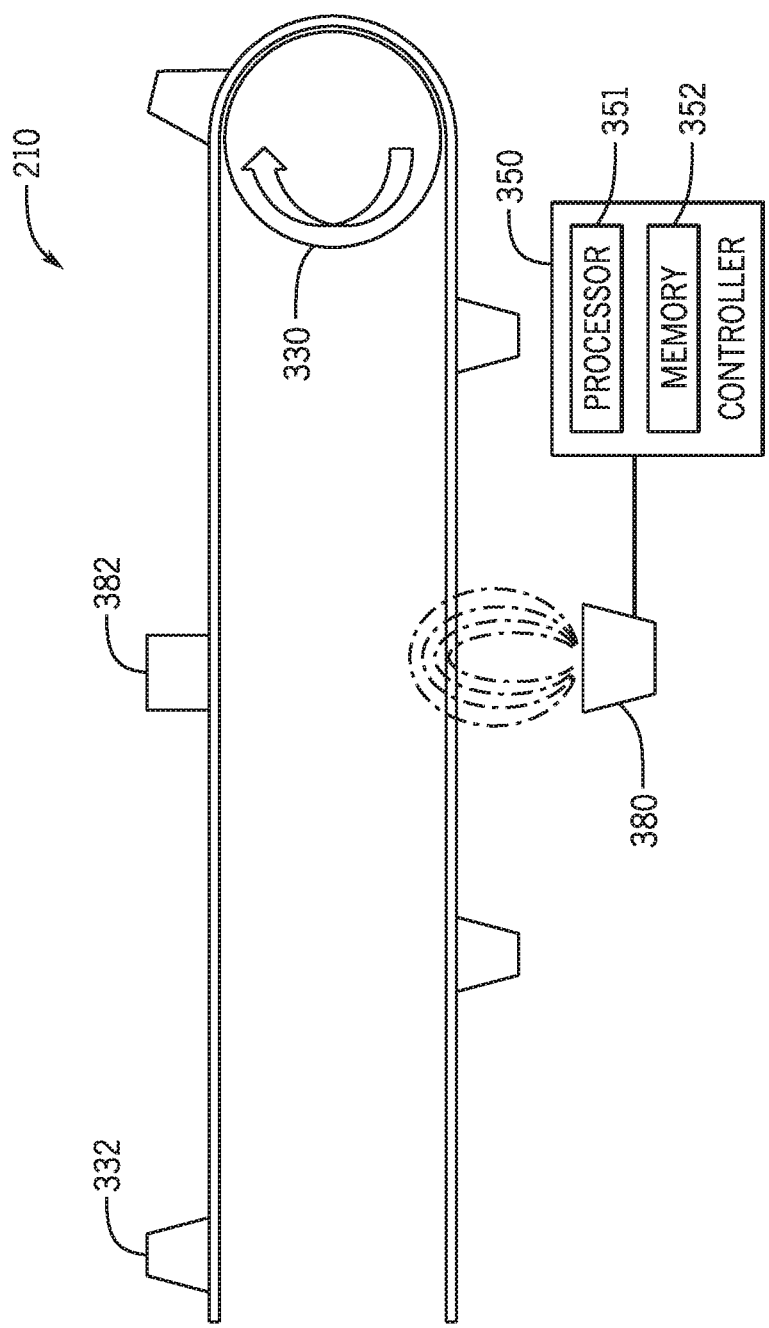
FIG. 6 is a side view of the portion of the header of FIG. 2, in which a belt assembly includes a metal-detection sensor, in accordance with embodiments of the present disclosure.

FIG. 6 shows a side view of a portion of the header 200 of FIG. 2 in which the rotational speed of the longitudinal belt 210 is measured by a metal-sensitive sensor 380 (e.g., Hall-effect sensor; inductive sensor). As previously discussed, the roller 330 moves the longitudinal belt 210, which includes lugs 332 (e.g., is coupled to or integrally formed with; any number of lugs 332). Furthermore, the longitudinal belt 210 may be manufactured with a metal splice 382. The metal splice 382 connects ends of the longitudinal belt 210 to form a loop, which enables the longitudinal belt 210 to continuously rotate around the rollers 330 (e.g., without the metal splice 382, the longitudinal belt 210 would be a sheet of material having two ends and would not form a loop). In some embodiments, the longitudinal belt 210 may only include one metal splice 382, although it should be appreciated that multiple sections of the material that forms the longitudinal belt 210 may be joined together via multiple metal splices 382. The metal splice 382 is a physical feature that can be detected by the metal-sensitive sensor 380. In particular, the metal-sensitive sensor 380 detects metal strands of the metal splice 382 that are used to attach the ends of the longitudinal belt 210 to each other.

Similar to the rotary sensor discussed above with reference to FIG. 3 and the optical sensor discussed above with reference to FIG. 4, the metal-sensitive sensor 380 may be placed anywhere relative to the longitudinal belt 210, the roller 330, and the header to measure the pulse frequency of the metal splice 382 as the metal splice 382 passes within range of the metal-sensitive sensor 382. In the illustrated embodiment, as the metal splice 382 passes the metal-sensitive sensor 382, a pulse is detected. Thus, the metal-sensitive sensor 382 enables calculation of the rotational speed of the longitudinal belt 210 by measuring the pulse frequency associated with the metal splice 382 on the longitudinal belt 210 (e.g., a time between detection of the metal splice 382; a time between pulses).

The pulses measured by the metal-sensitive sensor 380 may be sent from the metal-sensitive sensor 380 to the controller 350 via a wired or wireless connection. The controller 350 may control operation of the metal-sensitive sensor 380 and/or process signals received from the metal-sensitive sensor 380. For example, the controller 350 may receive pulse signals from the metal-sensitive sensor 380. The processor 351 may process the pulse signals to determine the rotational speed of the longitudinal belt 210, as discussed above with reference to FIG. 3.

In the embodiment shown, the metal-sensitive sensor 380 may output a signal that has increases in amplitude over time (e.g., pulses), as represented by a pulse frequency graph that is illustrated in and discussed in more detail below with reference to FIG. 7. While the longitudinal belt 210 is illustrated in and described with reference to FIG. 6, it should be appreciated that additionally or alternatively one or more of the lateral belts may be monitored in the same manner. For example, each of the lateral belts may rotate about a respective roller, and a respective optical sensor may be used to measure a respective rotational speed of each of the lateral belts. The controller 350 may receive a respective signal from the respective metal-sensitive sensor and may determine whether the respective signal indicates slippage relative to the respective roller.

Figure 7:
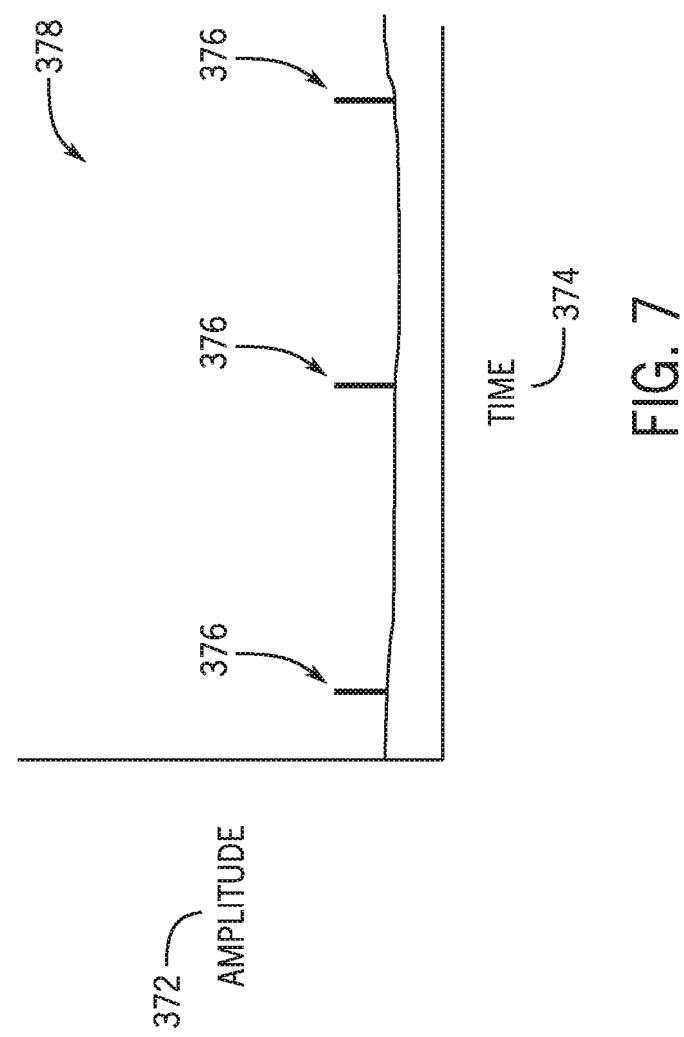
FIG. 7 is a graph that shows a signal that may be output by the metal-detection sensor of FIG. 6, in accordance with embodiments of the present disclosure.

With the foregoing in mind, FIG. 7 shows a pulse frequency graph 378, which may be representative of a signal output by the metal-sensitive sensor of FIG. 6 and/or which may facilitate understanding of the present techniques. In some embodiments, the pulse frequency graph 378 may be generated by the controller 350. The pulse frequency graph 378 may be a 2D plot of the amplitude 372 along the y-axis and the time 374 along the x-axis. The amplitude 372 represents the presence or absence of the metal splice within the range of the metal-sensitive sensor. The amplitude 372 changes (e.g., increases) in response to the metal splice being within the range of the metal-sensitive sensor. This change in amplitude 372 is represented by a pulse 376 on the pulse frequency graph 378. The pulse 376 may be long or short depending on the amount of time 374 it takes for the metal splice to pass the metal-sensitive sensor. A time between each pulse 376 (i.e., period) represents the time between each detection of the metal splice (e.g., each occurrence of the metal splice passing by the metal-sensitive sensor). By calculating the period between the pulses 376 over time and using a known length of the longitudinal belt (or distance between the metal splice(s), if multiple are present), the controller may determine the rotational speed of the longitudinal belt. Then, the controller may compare the rotational speed of the longitudinal belt to the rotational speed of the roller, in the manner discussed above.

With reference to FIGS. 3-7, it should be appreciated that certain features may be combined. For example, the longitudinal belt may include any number of metal pieces (e.g., metallic physical features, other than the metal splices that join ends of the material that forms the longitudinal belt together; coupled to or integrally formed within the longitudinal belt). Then, the metal-sensitive sensor may be used to detect the metal pieces and to generate a pulse each time one of the metal pieces passes within the range of the metal-sensitive sensor. Then, the controller may process the signal from the metal-sensitive sensor, such as to determine whether the longitudinal belt is slipping relative to the roller, for example. Additionally or alternatively, the lateral belts may be monitored in a similar manner. Furthermore, the various types of sensors and detectable features (e.g., lugs, metal splice, metal pieces) may be used together on the header. For example, one belt may include lugs, and the rotary sensor or the optical sensor may be used to detect the lugs, and another belt may include the metal splice or the metal pieces, and the metal-sensitive sensor may be used to detect the metal splice or the metal pieces. Such a configuration may be useful to fit the components within different volumes of available space on the header, for example.

Figure 8:
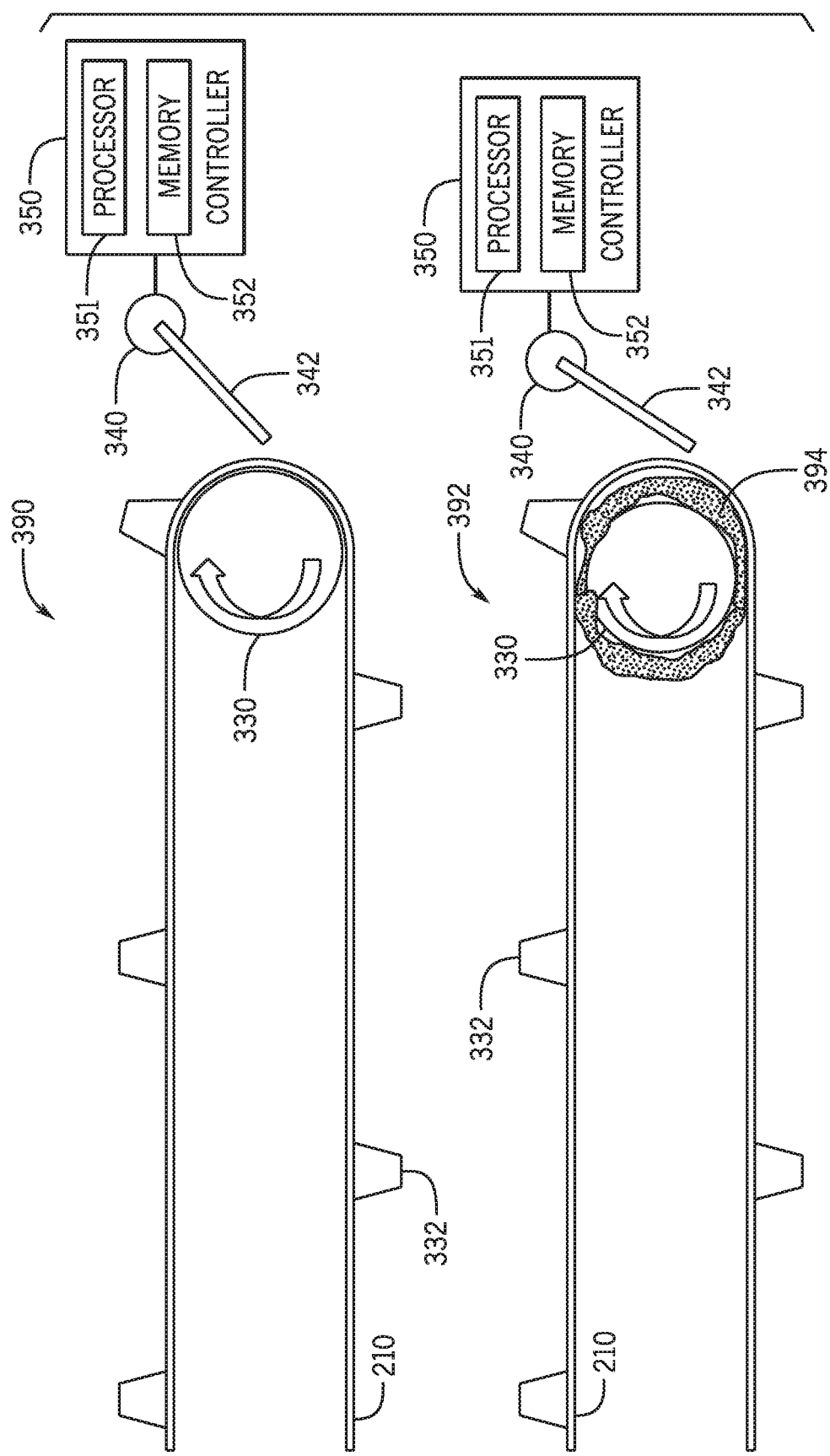
FIG. 8 is a side view of a portion of the header of FIG. 2, in which a belt assembly includes a rotary sensor configured to detect wrapping on a roller, in accordance with embodiments of the present disclosure.

FIG. 8 shows two side views of a portion of the header 200 of FIG. 2 in which a wrapping of a crop 390 about the roller 330 is detected by a rotary sensor 340. In a first configuration or operational state 390, there is no crop 394 (e.g., no substantial amount of crop; a first smaller amount of crop) wrapped about the roller 330. In a second configuration or operational state 392, there is crop 394 (e.g., a substantial amount crop; a second larger amount of crop) wrapped about the roller 330.

In the second configuration or operational state 392, the crop 394 that is wrapped about the roller 330 causes (e.g., drives; pushes) the longitudinal belt 210 to separate from the roller 330 and to move radially outwardly from the roller 300. Thus, an offset position of the longitudinal belt 210 may change, and the offset position is a radial distance between an inner surface of the belt and an outer surface of the roller.

The change in the offset position or movement of the longitudinal belt 210 may be detected by the rotary sensor 340. It should be appreciated that while the rotatory sensor 340 is positioned to measure an outer surface of the longitudinal belt 210, any suitable sensor may be used to detect changes in the offset position by measure the outer surface or the inner surface of the longitudinal belt 210. For example, in the illustrated embodiment, the crop 394 that is wrapped about the roller 330 causes (e.g., drives; pushes) the longitudinal belt 210 to move closer to the arm 342 and to drive movement of the arm 342. While the arm 342 is illustrated as being separated from the outer surface of the longitudinal belt 210 in both configurations 390, 392 to facilitate discussion and to more clearly show all components, it should be appreciated that the arm 342 may contact the outer surface of the longitudinal belt 210 as the longitudinal belt 210 moves about the roller 330. The movement of the arm 342 may cause the rotary sensor 340 to output a signal indicative of the change in the position of the longitudinal belt 210, and the controller 350 may receive the signal and process the signal to determine that the crop 394 is wrapped around the roller 330. For example, in response to the signal indicating that the arm of the rotary sensor has been displaced for an extended period of time (e.g., over a time threshold; longer than the time threshold), the controller 350 may determine that the crop 394 is wrapped around the roller 350.

Additionally or alternatively, in response to the signal indicating that the arm of the rotary sensor has been displaced (e.g., by a certain amount; indicates an offset distance 399 exceeds an offset threshold and extends over the time threshold), the controller 350 may determine the amount of the crop 394 wrapped around the roller 330 is substantial and/or that the amount of crop 394 warrants an output. The output may include an alarm, a displayed message, and/or some other automated or manually activated action, such as adjusting one or more operational parameters of the roller 330, the header 200, and/or the agricultural harvester 100 via the controller 350 (e.g., to stop the roller, to decrease the rotational speed of the roller to another nonzero rotational speed to clear the crop 394 from about the roller 330, to increase the rotational speed of the roller to clear the crop 394 from about the roller 330, to alternate between higher and lower speeds of the roller to clear the crop 394 from about the roller 330; to reverse a direction of rotation of the roller 330 to clear the crop 394 from about the roller 330; to adjust the positioning of the header 200; to adjust the ground speed of the agricultural harvester 100, such as to stop the agricultural harvester 100 or to reduce the ground speed to another nonzero ground speed). The action may be carried out until the crop 394 is cleared from about the roller 330 (e.g., as indicated by the signal from the rotary sensor 340), or the controller 350 may first adjust the one or more operational parameters and then provide the alarm and/or the displayed message in response to the action not effectively clearing the crop from about the roller 330 (e.g., over some period of time).

In some embodiments, the longitudinal belt 210 may include the lugs 332, and the rotary sensor 340 may detect the lugs 332 to enable determination of the rotational speed of the longitudinal belt 210 and slippage of the longitudinal belt 210, as discussed above. Thus, the controller 350 may monitor both the wrapping of the crop 394 and the slippage/ rotational speed (e.g., using one sensor, such as the rotary sensor 340).

Figure 9:
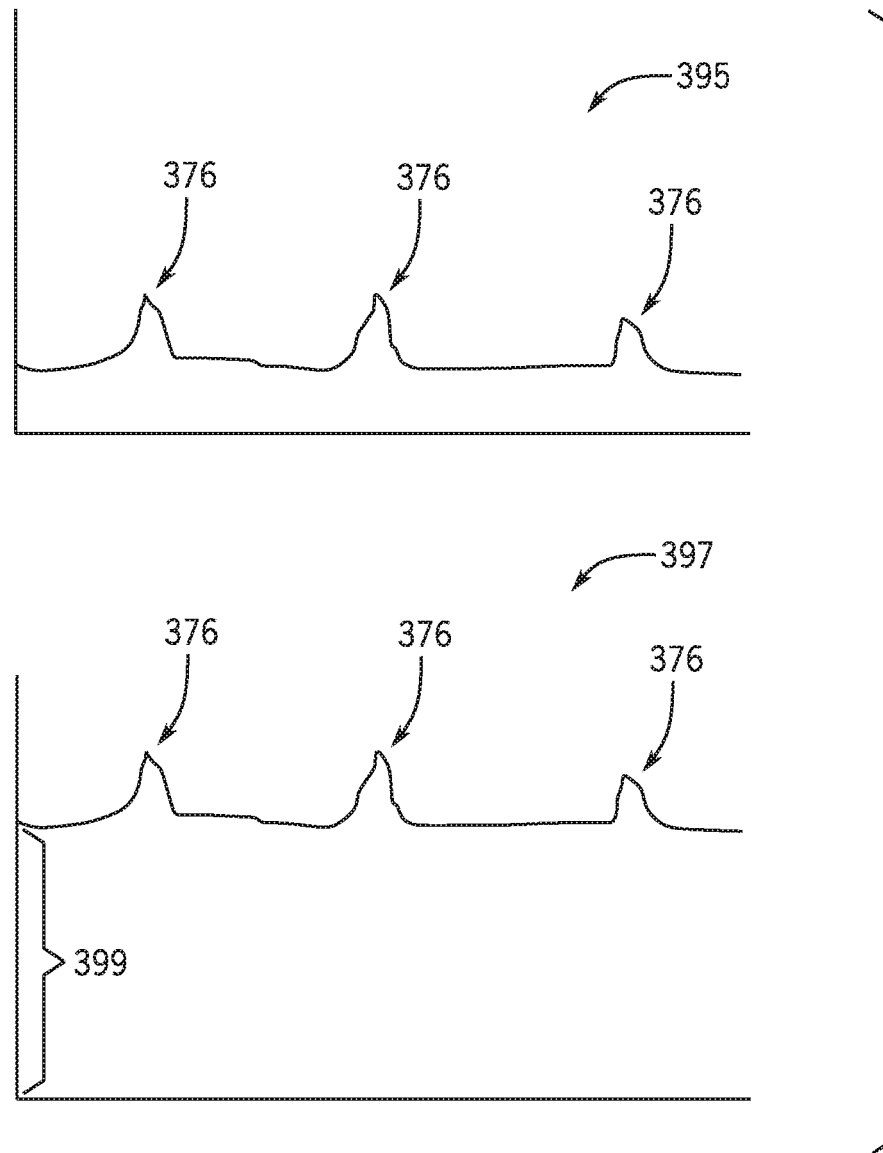
FIG. 9 is a graph that shows a signal that may be output by the rotary sensor of FIG. 8 in response to the wrapping on the roller, in accordance with embodiments of the present disclosure.

With the foregoing in mind, FIG. 9 shows two pulse frequency graphs 395 and 397, which may be representative of a signal output by the rotary sensor of FIG. 8 and/or which may facilitate understanding of the present techniques. In some embodiments, the pulse frequency graphs 395 and 397 may be generated by the controller 350. The first pulse frequency graph 395 may be a 2D plot of amplitude 372 along the y-axis and time 374 along the x-axis. The amplitude 372 may be representative of an amount of movement of the arm of the rotary sensor.

The pulse frequency graph 395 corresponds to the first configuration or operating condition of FIG. 8, and the pulse frequency graph 397 corresponds to the second configuration or operating condition of FIG. 8. As the crop wrapped around the roller increases, the amplitude 372 changes (e.g., increases) in response to movement of the arm of the rotary sensor. In particular, as shown, the amplitude 372 is offset by the offset distance 399 over time (e.g., a long period of time, as compared to relatively short pulses 376 due to lugs passing by the rotary sensor; the offset distance 399 represents a change in the offset position of the belt and is an amount by which a baseline amplitude or minimum amplitude is changed) as a result of the wrapping of the crop around the roller. Because the longitudinal belt is expanded due to the crop wrapping around the roller, the distance between the longitudinal belt and the rotary sensor changes (e.g., decreases) and results in the offset amount 399 on the pulse frequency graph 397. It should be appreciated that the optical sensor may be utilized in a similar manner to detect the offset amount 399 and the wrapping of the crop around the roller (e.g., the signal output by the optical sensor will indicate a change in the amplitude due to a change in a distance between the longitudinal belt and the optical sensor). It should also be appreciated that each belt may include one or more rollers, and each roller (or at least rollers at ends of the belt) may include an associated sensor to facilitate detection of the wrapping of the crop about each roller. The techniques discussed with reference to FIGS. 8 and 9 may be applied to any belts. Furthermore, as noted above, the features of the embodiments in FIGS. 3-9 may be combined. For example, one type of sensor may be used to monitor slippage and another type of sensor may be used to monitor wrapping of the crop about the roller. The sensors and associated components that are used to carry out the techniques disclosed herein may be referred to as a detection system.

Figure 10:
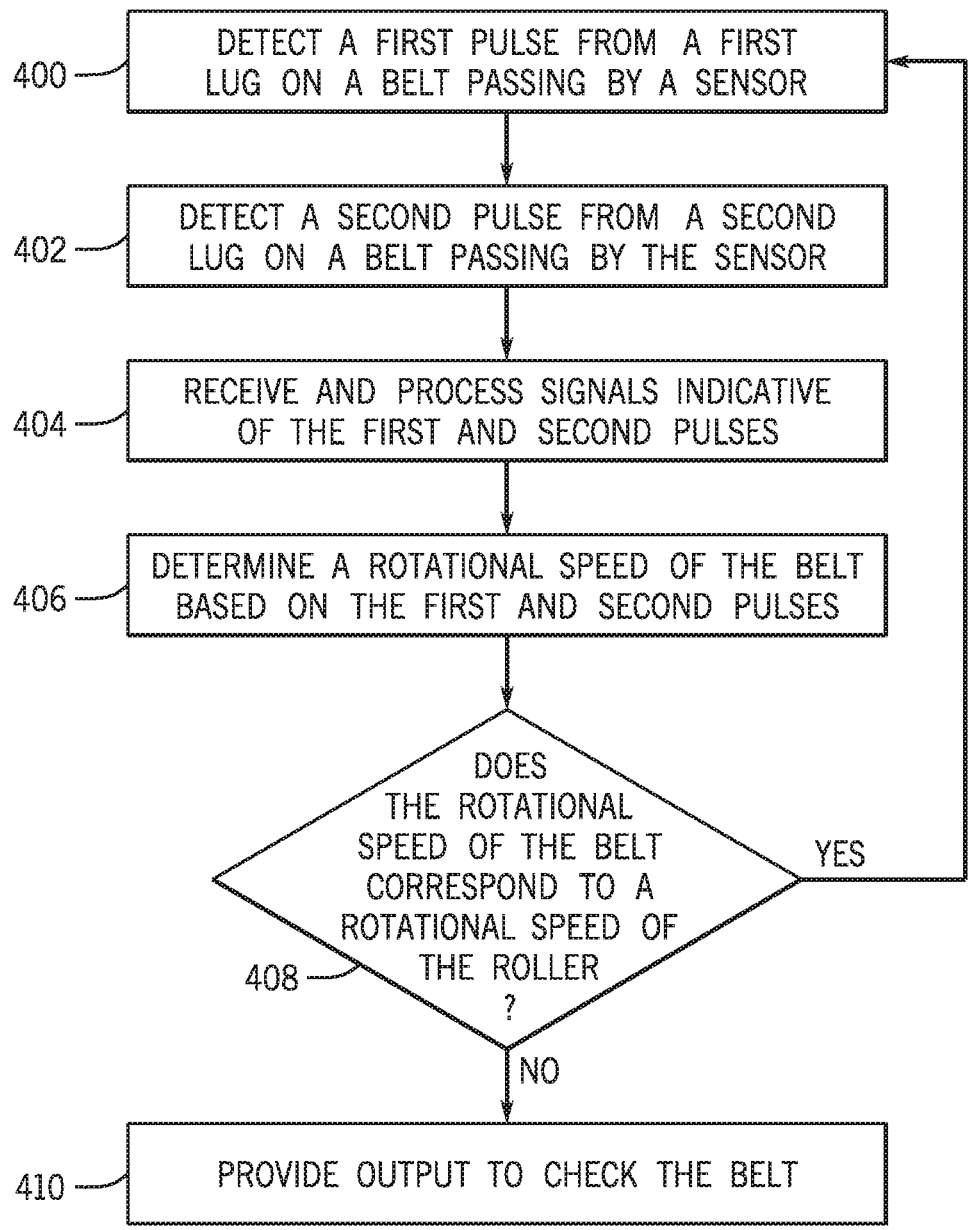
FIG. 10 is a block diagram depicting a method to detect belt slippage, in accordance with embodiments of the present disclosure.

FIG. 10 shows steps of a method for detecting belt slippage. In step 400, a sensor detects a first pulse from a first lug of a belt rotating about a roller. The pulse may be detected through a rotary sensor, an optical sensor, a metal-sensitive sensor, or any other type of sensor (e.g., magnetic sensor). The pulse may be due to the first lug passing by the sensor, and the signal indicative of the pulse may be sent to a controller connected to the sensor.

In step 402, the sensor detects a second pulse from a second lug of the belt rotating about the roller. The pulse may be due to the second lug passing by of the sensor, and the signal indicative of the pulse may be sent to the controller connected to the sensor.

In step 404, the controller receives and processes the signals indicative of the first pulse and the second pulse. In step 406, the controller determines a rotational speed of the belt based on the first pulse and the second pulse.

In step 408, the controller may compare the rotational speed of the belt to a rotational speed of a roller that drives the belt. In response to determining that the rotational speed of the belt matches the rotational speed of the roller (e.g., substantially matches; is within expected parameters), the process continues to repeat at step 400. In response to determining that the rotational speed of the belt does not match the rotational speed of the roller, the process continues to step 410.

In step 410, the controller may provide an output, such as an alarm and/or a displayed message to instruct an operator to check the belt. As noted above, in some embodiments, the output may be additionally or alternatively include another action, such as controlling or adjusting one or more operational parameters, such as adjusting the rotational speed of the roller (e.g., to stop the roller, to decrease the rotational speed of the roller to another nonzero rotational speed to reduce slippage, to increase the rotational speed of the roller to effectively move the crop even in the presence of slippage, and the like). Furthermore, as noted above, the method to detect the slippage may be carried out in conjunction with (e.g., at the same time, using the same sensor) techniques to detect that the crop is wrapped about the roller. The controller may be configured to provide an output, such as an alarm and/or a displayed message, and/or to take another action, such as controlling or adjusting the rotational speed of the roller in the same manner based on whether the crop is wrapped about the roller.

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A detection system for an agricultural header, the detection system comprising:
   a belt comprising at least one physical feature;
   a roller configured to drive rotation of the belt, wherein the roller is configured to rotate at a roller rotational speed;
   a sensor configured to detect the at least one physical feature as the at least one physical feature passes the sensor during the rotation of the belt, wherein the sensor is positioned relative to the belt and the roller such that the at least one physical feature passes the sensor while the at least one physical feature travels along an outer surface of the roller; and
   a controller configured to:
      receive a signal from the sensor, wherein the signal comprises a first pulse indicative of a first time at which the at least one physical feature passes the sensor during the rotation of the belt and a second pulse indicative of a second time at which the at least one physical feature passes the sensor during the rotation of the belt;
      determine a pulse frequency based on the first time and the second time;
      calculate a belt rotational speed based on the pulse frequency;
      compare the belt rotational speed to the roller rotational speed; and
      provide an output in response to determining that a variation between the belt rotational speed and the roller rotational speed exceeds a threshold.

2. The detection system of claim 1, wherein the sensor comprises a rotary sensor comprising an arm that is configured to contact the at least one physical feature.

3. The detection system of claim 2, wherein the arm is set to a first position and moves to a second position in response to contacting the at least one physical feature, and wherein the arm returns to the first position in response to contact with the at least one physical feature ending.

4. The detection system of claim 1, wherein the sensor comprises an optical sensor.

5. The detection system of claim 4, wherein the optical sensor is configured to monitor a distance between the belt and the optical sensor.

6. The detection system of claim 1, wherein the sensor comprises a metal-sensitive sensor.

7. The detection system of claim 1, wherein the sensor is configured to detect an offset radial distance between the outer surface of the roller and an inner surface of the belt, and the controller is configured to provide another output in response to determining that the offset radial distance exceeds an offset threshold.

8. The detection system of claim 1, wherein the output comprises an alarm, a displayed output, an instruction to adjust one or more operational parameters, or any combination thereof.

9. The detection system of claim 1, wherein the sensor is positioned relative to the belt and the roller to enable the sensor to detect the at least one physical feature as the at least one physical feature passes between the outer surface of the roller and the sensor during the rotation of the belt.

10. The detection system of claim 1, where the roller is proximate to a center of the agricultural header.

11. The detection system of claim 1, wherein the output comprises an instruction to adjust one or more operational parameters of the agricultural header.

12. The detection system of claim 1, wherein the output comprises an instruction to adjust the roller rotational speed.

13. A method for operating a detection system for an agricultural header, the method comprising:
- receiving, at a processor, a first pulse indicative of a first physical feature passing a sensor as the first physical features travels along an outer surface of a roller;
- receiving, at the processor, a second pulse indicative of a second physical feature passing the sensor as the second physical features travels along the outer surface of a roller;
- determining, using the processor, a pulse frequency based on a time between the first pulse and the second pulse;
- calculating, using the processor, a belt rotational speed based on the pulse frequency;
- comparing, using the processor, the belt rotational speed to a roller rotational speed of the roller that drives rotation of the belt; and
- providing, using the processor, an output in response to determining that a variation between the belt rotational speed and the roller rotational speed exceeds a threshold.

14. The method of claim 13, wherein providing the output comprises providing an alarm or a displayed notification.

15. The method of claim 13, wherein providing the output comprises providing an instruction to adjust the roller rotational speed.

16. The method of claim 13, comprising:
- receiving, at the processor, a signal indicative of an offset radial distance between the outer surface of the roller and an inner surface of the belt;
- comparing, using the processor, the offset radial distance to an offset threshold; and
- providing, using the processor, another output in response to determining that the offset radial distance exceeds the offset threshold.

17. The method of claim 16, comprising providing, using the processor, the another output in response to determining that the offset radial distance exceeds the offset threshold for longer than a time threshold.

18. The method of claim 15, wherein receiving the first pulse comprises receiving the first pulse from a rotary sensor, an optical sensor, or a metal-sensitive sensor.

19. The method of claim 16, comprising processing, at the processor, a signal from the sensor to identify the first pulse, the second pulse, and an offset radial distance between the outer surface of the roller and an inner surface of the belt.

20. An agricultural header, comprising:
- a belt configured to rotate to enable the belt to convey crops, wherein the belt comprises at least one physical feature;
- a roller configured to drive rotation of the belt, wherein the roller is configured to rotate at a roller rotational speed;
- a sensor configured to:
  - detect a change in an offset position of the belt, wherein the offset position comprises a radial distance between an inner surface of the belt and an outer surface of the roller; and
  - detect the at least one physical feature as the at least one physical feature passes the sensor during the rotation of the belt, wherein the sensor is positioned relative to the belt and the roller such that the at least one physical feature passes the sensor while the at least one physical feature travels along the outer surface of the roller; and
- a controller configured to:
  - receive a signal from the sensor, wherein the signal comprises an offset radial distance indicative of the change in the offset position of the belt, and the signal comprises a first pulse indicative of a first time at which the at least one physical feature passes the sensor during the rotation of the belt and a second pulse indicative of a second time at which the at least one physical feature passes the sensor during the rotation of the belt;
  - compare the offset radial distance to an offset threshold;
  - provide an output in response to determining that the offset distance exceeds the offset threshold;
  - determine a pulse frequency based on the first time and the second time;
  - calculate a belt rotational speed based on the pulse frequency;
  - compare the belt rotational speed to the roller rotational speed; and
  - provide another output in response to determining that a variation between the belt rotational speed and the roller rotational speed exceeds a threshold.

* * * * *